United States Patent Office 3,629,219
Patented Dec. 21, 1971

3,629,219
PROCESS FOR INCREASING THE SURFACE AREA OF GRANULAR POLYTETRAFLUOROETHYLENE RESIN
Richard B. Esker, Vienna, W. Va., assignor to E. I. du Pont de Nemours and Company, Wilmington, Del.
No Drawing. Filed Oct. 9, 1968, Ser. No. 766,314
Int. Cl. C08f 3/24
U.S. Cl. 260—92.1    8 Claims

ABSTRACT OF THE DISCLOSURE

Tetrafluoroethylene is polymerized to granular polymer in an aqueous polymerization system containing free radical initiator and dispersing agent which produces polymer of increased specific surface area. Titration of the buffer into the system during polymerization or elimination of the buffer entirely further increases the specific surface area of the granular polymer produced.

---

This invention relates to a polymerization process for producing granular polytetrafluoroethylene of increased specific surface area.

The polymerization of tetrafluoroethylene to granular polymer is disclosed in U.S. Pat No. 2,393,967 to Brubaker. Basically, this polymerization process involves the preparation of an aqueous solution of a water-soluble polymerization initiator, an initiator activator if desired, and a buffer to stabilize the pH of the polymerization medium at the desired level, which can be neutral or on the acid or basic side. The polymerization medium is subjected to high agitation and tetrafluoroethylene is pressured into the medium at a temperature in the range of about 50–100° C., whereby polymerization rapidly occurs in the form of polymer granules which separate quickly from the polymerization medium to give a slurry of polymer. This granular polytetrafluoroethylene differs from polytetrafluoroethylene fine powder which is obtained from aqueous polymerization as a dispersion which is coagulated after polymerization is completed. The fine powder polymer has a different feel than granular polymer, i.e., it is much softer, has a much higher specific surface area, and is fabricated by different processes, such as paste extrusion. In the fabrication of granular polymer, i.e., by high pressure compaction followed by sintering, moldability is improved with increasing specific surface of the polymer. Unfortunately, the resin produced by the Brubaker process has a relatively low specific surface area even after comminution. Comminution, such as by the process of U.S. Pat. No. 2,936,301 to Thomas et al. provides some improvement in moldability but does not significantly increase the specific surface area of the polymer.

Specific surface area is the area of the entire surface, both external and internal, of the polymer. Specific surface area is the "total surface area per gram" described in U.S. Pat No. 3,245,972 to Anderson et al. and is measured as described therein.

U.S. Pat No 3,245,972 to Anderson et al also describes a modification of the granular polymer polymerization process to produce granular polytetrafluoroethylene of increased specific surface area from the polymerization system. One embodiment of this modification involves adding a small amount of dispersing agent to the polymerization medium before pressuring with tetrafluoroethylene. This small amount of dispersing agent promotes the formation of nuclei believed to be of polytetrafluoroethylene dispersion polymer in this granular polymerization system. These nuclei act as sites for the growth of granular polymer upon further polymerization, leading to the production of granular polytetrafluoroethylene of increased specific surface area over that which would have been obtained under the same polymerization conditions, but in the absence of dispersing agent.

It has now been discovered that the presence of buffer in the polymerization system has an adverse effect on the effect of the dispersing agent in the granular polymerization system, i.e., although the dispersing agent provides a polymer of increased specific surface area, the full capability of the dispersing agent in this respect is not realized. Thus, in one embodiment of the present invention, the buffer is eliminated entirely from the polymerization system. This requires that the polymerization be carried out in a reaction vessel which is inert to the reaction.

In another embodiment of the present invention, wherein a reaction vessel which is corrodible by the polymerization system is used, and whereby buffer is necessary to maintain the pH of the polymerization medium at a level where such corrosion is reduced to an acceptable level, the present invention involves adding the buffer gradually during the polymerization rather than all at once prior to the polymerization reaction as is done in present practice. In other words, the buffer is titrated into the polymerization medium at a rate corresponding to the rate of acids formed during the polymerization, such acids herein referred to as tetrafluoroethylene-acid, rather than being initially added in a sufficient amount to maintain pH at the desired level despite the amount of acid formed. In this embodiment of the invention, the amount of buffer present during the initial nucleation stage of the polymerization is thus minimized so as to minimize the adverse effect on the buffer on specific surface area. Sufficient buffer is added, however, to prevent undue corrosion of the polymerization vessel.

The present invention is applicable in general to the embodiment of the Anderson et al. process wherein dispersing agent is present to promote the formation of nuclei. Polymerization initiators that can be used include the sodium, potassium, calcium, barium, or ammonium salts of peracids. Activators that can be used include sodium bisulfite or sodium hydrosulfite. Details on the use and amounts of these ingredients are given in the Brubaker and Anderson et al. patents hereinbefore disclosed.

Suitable dispersing agents include any of those which provide water-wet nuclei at the initial stage of polymerization. Preferably, the dispersing agent is substantially free of any telogenic activity so that any undesirable decrease in polymer molecular weight is avoided. The preferred dispersing agents are those which are fluorinated, examples of which are ammonium perfluoro-octanoate or caprylate. The amount of dispersing agent used will be the amount that is effective to lead to the formation of the requisite number of nuclei which in turn leads to the specific surface area desired. Generally, the amount of dispersing agent used will be from 25 to 500 p.p.m. based on the weight of the liquid polymerization medium. The exact amount of dispersing agent used in any particular system will depend on such factors as which dispersing agent, and buffer are used and the conditions under which the polymerization is carried out. In a preferred system of the present invention, when ammonium perfluorooctanoate and ammonium carbonate are used as the dispersing agent and buffer respectively, preferably from 25 to 100 p.p.m. of the dispersing agent is used. Further details on the use of dispersing agent are described in the Anderson et al. patent hereinbefore disclosed.

Buffer is also present in the Anderson et al. polymerization medium. Whether or not buffer is used in the present invention will depend mainly on the choice of polymerization vessel. When the polymerziation vessel is inert, i.e., the degree of attack by the polymerization medium is inconsequential, to the polymerization medium, buffer can be eliminated entirely. Thus, the ingredients in the polymerziation medium will consist essentially of initiator, activator if desired, dispersing agent and monomer. If the dispersing agent is eliminated as well, the benefit of increased specific surface area of the polymer is not obtained. Examples of inert polymerization vessels include glass-lined vessels and vessels made of Monel or such noble metals as platinum.

Polymerization vessels made of stainless steel are not inert to the polymerization medium, but are slowly corroded thereby, with the degree of corrosion depending on the pH of the medium. The greater the acidity of the medium, the greater is the corrosion of the vessel. Apart from the long-term damaging effect of this corrosion on the vessel, metal ions from the vessel contaminate the polymer, causing the more serious problem of discoloration upon sintering. Historically, buffer has been used to control the pH of the medium either on the weak acid side or the basic side to minimize the discoloration from this source to a tolerable level. Typically, a metal ion concentration in the polymerization medium of no greater than 50 p.pm. (weight basis) is tolerable in this respect.

The exact pH selected for buffering the polymerization medium will depend on the level of metal contamination that can be tolerated by any particular application of the polymer, under the reaction conditions employed. Generally, the pH will be maintained at at least 7. However, pH's at as low as 6.0 and 5.5 have produced polymer which is satisfactory in color for many applications.

Examples of buffers include ammonium biborate, ammonium carbonate, ammonium bicarbonate, ammonium pentaborate, ammonium tetraborate, and ammonium hydroxide. Borax and other known alkali metal-containing salts can be used, but the ammonium buffers, as well as the ammonium initiators and activators, are preferred because the alkali metals present in the other known buffers contain metal ions which discolor the polymer in the same way as the metal ions derived from the polymerization vessel. Which buffer is selected will depend on the pH level desired.

The buffer is titrated into the polymerization medium after the initiator, activator, if any, and dispersing agent have been added, to adjust the pH of the system to the level desired; such can be at least 5.5, 6.0, or 7, depending on the metal ion concentration from vessel corrosion that can be tolerated. Upon pressurizing of the system with tetrafluoroethylene monomer, increasing amounts of tetrafluoroethylene-acid as well as polymer are formed, tending to lower the pH. The buffer is added at a rate corresponding to the rate of generation of this acid to maintain the pH at the initial desired level until the polymerization is completed. The amount of buffer required can be determined by monitoring the pH of the medium and adding buffer accordingly. The titration need not be exact in the sense that the desired pH level is barely maintained. Good practice generally requires some excess of buffer in case of a sudden increase in the generation of acid. However, this excess is minimized as much as possible to get the greatest benefit from the presence of the dispersing agent in the medium. Within these guidelines, the buffer can be added continuously or in small batch increments throughout the polymerziation. Generally, at least no more than 25 percent of the total amount of buffer required for the entire polymerization run is added before polymerization is begun and the remainder is added as required throughout the run. The buffer is conveniently added as an aqueous solution.

Polymerization is preferably carried out to as high a conversion of tetrafluoroethylene to polymer as possible, whether the buffer is omitted entirely or gradually added to the polymerization system to realize the best improvement in specific surface area. Generally, polymerization is carried to form a polymer content of at least 15 by weight percent in the liquid medium, and preferably at least 20 percent.

The following examples are intended to illustrate the process of the present invention, and are not intended as limitations on the scope thereof. Parts and percents are by weight unless otherwise indicated. Parts per million is based on the weight of the liquid polymerization medium.

In each of the examples the following general procedure was used. 18,600 parts of demineralized water were charged to a vertically disposed stirred autoclave having a capacity of 26,100 parts and equipped with a four-blade flat paddle agitator having a ratio of power number to discharge coefficient of 3.4. Ammonium persulfate initiator (0.233 part) and the indicated amounts of ammonium perfluorooctanoate dispersing agent and the indicated amounts of the buffering agent were charged. Stirring was then commenced and the charge heated to the desired reaction temperature. The free space above the charge was then thrice evacuated and purged with TFE, after which the charge is pressured to 250 p.s.i.g. with TFE and reacted at 250 p.s.i.g. and 65° C. with 600 RPM agitation. The reaction was continued until 5450 parts of TFE was reacted, which is equivalent to 23 percent solids in the final polymer slurry.

EXAMPLES 1 to 4

Following the general procedure hereinbefore set forth, a series of polymerizations were carried out using various buffers and in one instance, no buffer at all. The amount of dispersing agent used in each polymerization was 75 ppm. Further details and the results obtained are shown in Table I. Elimination of the buffer (Example 4) gives a dramatic increase in specific surface area.

TABLE I

| Example | Buffer | Parts | pH Before polymer | pH After polymer | SSA of raw polymer (m.²/gm.) |
|---|---|---|---|---|---|
| 1 | $(NH_4)_2CO_3$ | 4.0 | 8.5 | 8.3 | 2.9 |
| 2 | $K_2CO_3$ | 4.0 | 10.5 | 10.5 | 2.7 |
| 3 | $(NH_4)_3PO_4$ | 9.0 | 8.7 | 3.3 | 2.7 |
| 4 | (¹) | (¹) | 4.3 | 3.9 | 7.4 |

¹ None.

When Example 4 is carried out in a glass-lined polymerization vessel, the color of the high specific surface area resin after sintering is satisfactory.

EXAMPLES 5 to 7

That the effects observed in Examples 1 to 4 were the result of an interaction of the buffer and the dispersing agent was proven by polymerizing by the same general procedure, except for the omission of buffer and the use of varying amounts of the same dispersing agent. Further details and results are shown in Table II. As the amount of dispersing agent is increased when no buffer is present, the specific-surface area of the polymer increases. When Examples 6 and 7 are carried out in a glass-lined polymerization vessel, polymer which sinters to a satisfactory color is produced.

TABLE II

| Example | Dispersing agent (p.p.m.) | Buffer | pH Start | pH End | SSA (m.²/gm.) |
|---|---|---|---|---|---|
| 5 | | | 4.6 | 4.3 | 1.4 |
| 6 | 37 | | 5.4 | 3.7 | 5.2 |
| 7 | 75 | | 4.5 | 3.4 | 7.1 |

EXAMPLES 8 to 10

These experiments show the effect on SSA of gradual addition of buffer to the polymerization medium, using the same general polymerization procedure hereinbefore set forth. By adding a small amount of ammonium carbonate buffer initially, so that the pH of the aqueous polymerizing medium is slightly over 7.0, initiating polymerization, and pumping a solution of amonium carbonate into the medium during polymerization, a high surface area resin is obtained. Further details and results are given in Table III. As shown for Example 9, the gradual addition of 7.0 g. of buffer throughout the run gives a higher SSA polymer than when 8.0 g. of buffer is added initially (Example 8). When an excessive amount of buffer is gradually added, the SSA of the polymer is reduced (Example 10).

TABLE III

|  | Example | | |
| --- | --- | --- | --- |
|  | 8 | 9 | 10 |
| Dispersing agent (p.p.m.) | 75 | 75 | 75 |
| $(NH_4)_2CO_3$ added, parts: | | | |
| Initially | 8.0 | 1.0 | 1.0 |
| Pumped | None | [1] 6.0 | [1] 11.6 |
| pH: | | | |
| Start | 8.6 | 7.9 | 7.8 |
| End | 8.6 | 8.0 | 8.2 |
| SSA (m.$^2$/gm.) | 2.4 | 4.8 | 3.5 |

[1] Total amount of buffer supplied by continuous gradual addition during polymerization.

As many apparently widely different embodiments of this invention may be made without departing from the spirit and scope thereof, it is to be understood that this invention is not limited to the specific embodiments thereof except as defined in the appended claims.

What is claimed is:

1. In the process of polymerizing tetrafluoroethylene in a polymerization vessel containing an aqueous medium containing polymerization initiator, and dispersing agent to obtain granular polytetrafluoroethylene of high surface area, said medium also containing sufficient initially added buffer to maintain said medium at a pH at which said vessel does not corrode at an unacceptable level, the improvement comprising maintaining said pH by titrating said buffer into said medium in an amount corresponding to the generation of tetrafluoroethylene-acid in said medium during said polymerization, rather than adding all said buffer to said medium prior to the start of said polymerization, and obtaining as a result thereof polymer of still further increased specific surface area.

2. The process of claim 1 wherein said pH which is maintained by titrating the buffer into the medium is at least 5.5.

3. The process of claim 2 wherein the dispersing agent is substantially free of telogenic activity.

4. The process of claim 2 wherein the dispersing agent is fluorinated.

5. The process of claim 2 wherein from 25 to 500 p.p.m. of said dispersing agent is present based on the weight of the liquid polymerization medium.

6. The process of claim 5 wherein the initiator is an ammonium salt of a peracid and the buffer is an ammonium compound.

7. The process of claim 6 wherein the buffer is ammonium carbonate.

8. The process of claim 7 wherein the dispersing agent is ammonium perfluorooctanoate.

References Cited

UNITED STATES PATENTS

| 2,393,967 | 2/1946 | Brubaker | 260—92.1 |
| 2,753,329 | 7/1956 | Kroll et al. | 260—92.1 |
| 3,009,892 | 11/1961 | Duddington et al. | 260—92.1 |
| 3,032,543 | 5/1962 | Bro et al. | 260—92.1 |

HARRY WONG, JR., Primary Examiner

U.S. Cl. X.R.

260—29.6